(12) United States Patent
Hirashima et al.

(10) Patent No.: US 7,474,435 B2
(45) Date of Patent: Jan. 6, 2009

(54) CONNECTION APPARATUS, CONNECTING METHOD, AND STORAGE MEDIUM FOR STORING COMPUTER-READABLE PROGRAM HAVING CONNECTING FUNCTIONS

(75) Inventors: Shigeyoshi Hirashima, Kanagawa (JP); Shinichi Horii, Kanagawa (JP); Hiroshi Tokunaga, Tokyo (JP); Masato Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/977,472

(22) Filed: Oct. 25, 2007

(65) Prior Publication Data

US 2008/0068654 A1    Mar. 20, 2008

Related U.S. Application Data

(62) Division of application No. 09/894,689, filed on Jun. 27, 2001, now Pat. No. 7,324,227.

(30) Foreign Application Priority Data

Jun. 29, 2000    (JP) .............................. 2000-201472

(51) Int. Cl.
*G06F 3/12*    (2006.01)
(52) U.S. Cl. ........................ 358/1.15; 358/1.14; 399/8; 399/9
(58) Field of Classification Search ................ 358/1.14, 358/1.15; 713/201, 225, 229, 200, 202, 1, 713/2; 710/39, 268; 370/344, 395.2; 399/8, 399/9, 12
See application file for complete search history.

(56) References Cited

U.S. PATENT DOCUMENTS

| | | | |
|---|---|---|---|
| 5,272,503 A | 12/1993 | LeSueur et al. | |
| 5,519,418 A | 5/1996 | Nishikawa et al. | |
| 5,606,671 A | 2/1997 | Wadsworth et al. | |
| 5,774,678 A | 6/1998 | Motoyama | |
| 5,786,828 A * | 7/1998 | Yamamoto | 347/19 |
| 5,826,014 A | 10/1998 | Coley et al. | |
| 5,844,813 A | 12/1998 | Tateyama | |
| 5,897,607 A | 4/1999 | Jenney et al. | |

(Continued)

FOREIGN PATENT DOCUMENTS

EP    0 873 873    10/1998

*Primary Examiner*—Kimberly A Williams
(74) *Attorney, Agent, or Firm*—Frommer Lawrence & Haug LLP; William S. Frommer (57) ABSTRACT

A connection apparatus is disclosed which includes a connection source and a connection destination. The connection source includes information about a predetermined connection destination; and a connecting element for making a connection request to the predetermined connection destination based on the information about the connection destination and, given a permission, for automatically connecting to the connection destination. The predetermined connection destination includes a receiving element for receiving the connection request from the connection source, a judging element which, upon interpreting the connection request, judges whether the connection source is a predetermined connection source or not, and a permission granting element which, if the judging element judges the connection source to be a predetermined connection source, then grants connection permission to the connection source.

3 Claims, 6 Drawing Sheets

U.S. PATENT DOCUMENTS

| | | |
|---|---|---|
| 5,930,553 A | 7/1999 | Hirst et al. |
| 5,997,193 A | 12/1999 | Petterutti et al. |
| 6,041,183 A | 3/2000 | Hayafune et al. |
| 6,115,376 A | 9/2000 | Sherer et al. |
| 6,301,012 B1 | 10/2001 | White et al. |
| 6,379,058 B1 | 4/2002 | Petteruti et al. |
| 6,470,453 B1 | 10/2002 | Vilhuber |
| 6,940,613 B1 | 9/2005 | Beard et al. |

\* cited by examiner

CONNECTION APPARATUS, CONNECTING METHOD, AND STORAGE MEDIUM FOR
STORING COMPUTER-READABLE
PROGRAM HAVING CONNECTING
FUNCTIONS

This is a division of application Ser. No. 09/894,689, filed Jun. 27, 2001 now U.S. Pat. No. 7,324,227, which is entitled to the priority filing date of Japanese application 2000-201472 filed on Jun. 29, 2000, the entirety of which is incorporated herein by reference.

BACKGROUND OF THE INVENTION

The present invention relates to a connection apparatus and a connecting method for automatically connecting a connection source to a connection destination, as well as a computer-readable program storage medium which stores a program offering connecting functions for establishing such connection.

Galloping developments in the information industry in recent years have led to widespread use of networks such as the Internet for data communication. Such networks are connected to numerous electronic devices including personal computers, data terminals and server computers. Generally, users gain access to the Internet through a previously contracted Information service provider. Conventionally, before hooking up to the Internet, users must make necessary settings on their PCs (all on their own) to establish connection to the Internet service provider.

The setting procedure involved is often so arcane and baffling that the general user with little specialized knowledge in the field has had a hard time completing the required settings. Because users with no such special knowledge are steadily on the increase, there is a growing need for suitable means allowing the users to handle network-ready electronic devices with ease.

SUMMARY OF THE INVENTION

It is an object of the present invention to provide a connection apparatus and a connecting method for readily connecting a connection source to a connection destination without the need for special settings, as well as a computer-readable program storage medium which stores a program with connecting functions capable of readily establishing such connection.

To achieve the above object, according to a first aspect of the present invention, there is provided a connection apparatus for automatically connecting a connection source to a predetermined connection destination, the connection source, including: information about the predetermined connection destination; and a connecting element for making a connection request to the predetermined connection destination based on the information about the predetermined connection destination and, given a permission, for automatically connecting to the connection destination; and the predetermined connection destination, including: a receiving element for receiving the connection request from the connection source; a judging element which, upon interpreting the connection request, judges whether the connection source is a predetermined connection source or not; and a permission granting element which, if the judging element judges the connection source to be a predetermined connection source, grants connection permission to the connection source.

With this configuration, the information about the connection destination can be set to the connection source beforehand. Based on that information, the connection source can make a connection request to the connection destination. Upon receipt of the connection request from the connection source, the connection destination can interpret the request and judges whether the connection source is a predetermined connection source or not. If the connection source is judged to be a predetermined connection source by the judging element, then connection permission can be granted to the connection source. This allows the connection source to hook up automatically to the predetermined connection destination.

With this configuration, the connection source may be connected to the connection destination without intervention of an Internet service provider being contracted.

This preferred structure supplements the functions of the first aspect of the invention with another function allowing the connection source to hook up automatically to the predetermined connection destination without intervention of any Internet service provider under contract.

In a second preferred structure of the connection apparatus according to the first aspect of the invention, the connection request may constitute a request for connection to an Internet service provider as well as a request for connection to the receiving means.

With this configuration, the functions of the first aspect of the invention with another function allow the connection source to make first a connection request to an Internet service provider and then a connection request to the receiving element of the connection destination. The connection source can thus connect automatically first to the Internet service provider and then to the predetermined connection destination.

In a third preferred structure of the connection apparatus according to the first aspect of the invention, the connection source may be a printer.

This preferred structure supplements the functions of the first aspect of the invention with another function allowing the connection source serving as the printer to hook up automatically to the connection destination.

In a fourth preferred structure of the inventive connection apparatus derived from the third preferred structure thereof, the printer may be connected to the predetermined connection destination using a trigger signal issued upon initial power-up.

With this configuration, the inventive connection apparatus with another function allows the printer to hook up automatically to the connection destination upon initial power-up with no specific settings made.

According to a second aspect of the invention, there is provided a connecting method for automatically connecting a connection source to a predetermined connection destination, the method comprising the steps of: setting information about the predetermined connection destination to the connection source in advance; causing the connection source to make a connection request to the predetermined connection destination based on the information about the predetermined connection destination; causing the predetermined connection destination to receive the connection request from the connection source in order to judge whether the connection source is a predetermined connection source or not upon interpreting the connection request; if the connection source is judged to be a predetermined connection source by the judging means, then granting connection permission to the connection source; and connecting the connection source to the predetermined connection destination.

With this configuration, the information about the connection destination can be set to the connection source beforehand. Based on that information, the connection source makes a connection request to the connection destination. Upon receipt of the connection request from the connection source, the connection destination interprets the request and judges whether the connection source is a predetermined connection source or not. If the connection source is judged to be a predetermined connection source in the judging step, then connection permission can be granted to the connection source. This allows the connection source to hook up automatically to the predetermined connection destination.

In a first preferred variation of the connecting method according to the second aspect of the invention, the connection source may be connected to the connection destination without intervention of an Internet service provider being contracted.

With this configuration, the functions of the second aspect of the invention with another function allow the connection source to hook up automatically to the predetermined connection destination without intervention of any Internet service provider under contract.

In a second preferred variation of the connecting method according to the second aspect of the invention, the connection request may constitute a request for connection to an Internet service provider as well as a request for connection to the connection destination.

With this configuration, the functions of the second aspect of the invention with another function allow the connection source to make first a connection request to an Internet service provider and then a connection request to the connection destination. The connection source can thus connect automatically first to the Internet service provider and then to the predetermined connection destination.

In a third preferred variation of the connecting method according to the second aspect of the invention, the connection source may be a printer.

This preferred variation supplements the functions of the second aspect of the invention with another function allowing the user who acquired the printer as the connection source to establish connection automatically to the connection destination.

In a fourth preferred variation of the inventive connecting method derived from the third preferred variation thereof, the printer may be connected to the predetermined connection destination using a trigger signal issued upon initial power-up.

With this configuration, the functions of the third preferred variation of the inventive connecting method with another function allow the printer to hook up automatically to the connection destination upon initial power-up, with no specific settings required.

According to a third aspect of the invention, there is provided a computer-readable program storage medium which stores a program with connecting functions comprising the steps of: setting information about the predetermined connection destination to the connection source in advance; causing the connection source to make a connection request to the predetermined connection destination based on the information about the predetermined connection destination; causing the predetermined connection destination to receive the connection request from the connection source in order to judge whether the connection source is a predetermined connection source or not upon interpreting the connection request; if the connection source is judged to be a predetermined connection source by the judging means, then granting connection permission to the connection source; and connecting the connection source to the predetermined connection destination.

With this configuration, the information about the connection destination can be set to the connection source beforehand. Based on that information, the connection source makes a connection request to the connection destination. Upon receipt of the connection request from the connection source, the connection destination interprets the request and judges whether the connection source is a predetermined connection source. If the connection source is judged to be a predetermined connection source in the judging step, then connection permission can be granted to the connection source. This allows the connection source to hook up automatically to the predetermined connection destination.

In a first preferred variation of the computer-readable program storage medium according to the third aspect of the invention, the connection source may be connected to the connection destination without intervention of an Internet service provider being contracted.

With this configuration, the functions of the third aspect of the invention with another function allow the connection source to hook up automatically to the predetermined connection destination without intervention of any Internet service provider under contract.

In a second preferred variation of the computer-readable program storage medium according to the third aspect of the invention, the connection request may constitute a request for connection to an Internet service provider as well as a request for connection to the connection destination.

With this configuration, the functions of the third aspect of the invention with another function allow the connection source to make first a connection request to an Internet service provider and then a connection request to the connection destination. The connection source can thus connect automatically first to the Internet service provider and then to the predetermined connection destination.

In a third preferred variation of the computer-readable program storage medium according to the third aspect of the invention, the connection source may be a printer.

With this configuration, the functions of the third aspect of the invention with another function allow the user who acquired the printer as the connection source to establish connection automatically to the connection destination.

In a fourth preferred variation of the inventive computer-readable program storage medium derived from the third preferred variation thereof, the printer may be connected to the predetermined connection destination using a trigger signal issued upon initial power-up.

With this configuration, the functions of the third preferred variation of the inventive storage medium with another function allow the printer to hook up automatically to the connection destination upon initial power-up with no specific settings made.

DESCRIPTION OF THE PREFERRED EMBODIMENT

Preferred embodiments of the invention will now be described with reference to the accompanying drawings.

Although the embodiments, examples or variations of this invention to be discussed below are subject to various technically preferred constraints, they are not limitative of the invention unless specifically noted otherwise.

Figure 1:
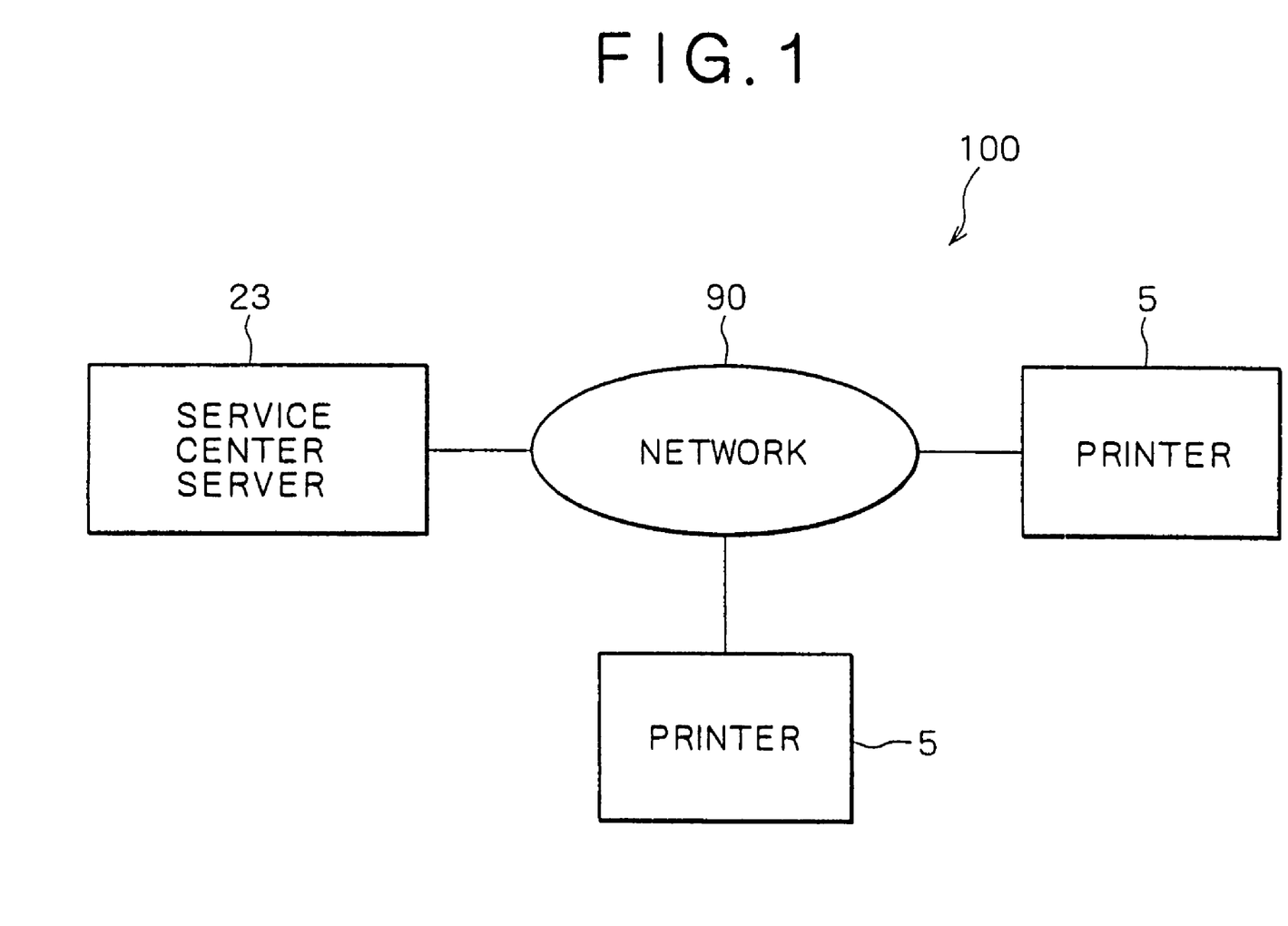
FIG. 1 is a schematic block diagram of a connection system practiced as one preferred embodiment of the invention.

FIG. 1 is a schematic block diagram of a connection system 100 practiced as one preferred embodiment of the invention.

The connection system 100 (connection apparatus) has a service center server 23 (connection destination) connected physically to printers 5 (connection sources) via a network 90. The printers 5 may alternatively be connected to the network 90 via repeaters such as rooters, not shown. The printers 5 and the service center server 23 are connected in a manner permitting data communication therebetween.

There should be at least one printer 5 purchased by a user. The printer 5 operates illustratively on the ink jet principle and is capable of printing on suitable sheets of paper. That means the printer 5 needs to be replenished from time to time with ink for the amount consumed printing on paper sheets.

The service center server 23 is a server computer installed at a service center that offers services such as maintenance of printers 5. The service center server 23 provides users of printers 5 with menus of service offerings made up of various maintenance preferences. The offerings include collecting a used-up ink cartridge or head assembly (integrating an ink cartridge with an ink jet head) of the printer 5 and replacing it with a new one.

Figure 2:
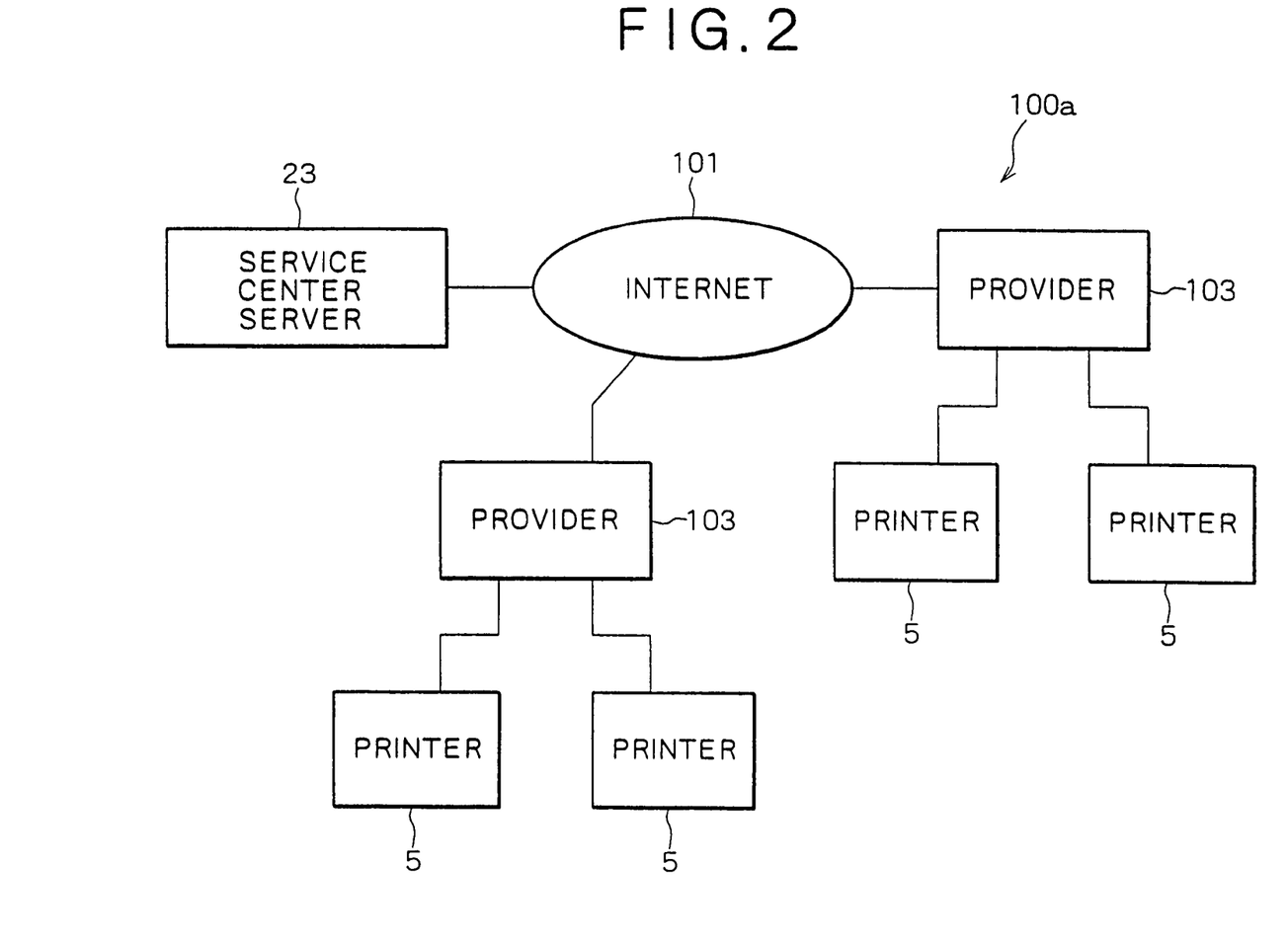
FIG. 2 is a schematic block diagram of another connection system shown in FIG. 1 according to the invention.

The network 90 may illustratively be a LAN (Local Area Network) or WAN (Wide Area Network); obviously it may also be what is known as an intranet. The connection system 100, as shown in FIG. 2, may constitute a connection system 100a (connection apparatus) having printers 5 hooked up to the Internet 101 via an Internet service provider 103. The Internet 101 in FIG. 2 is one example of the network 90 in FIG. 1.

Figure 3:
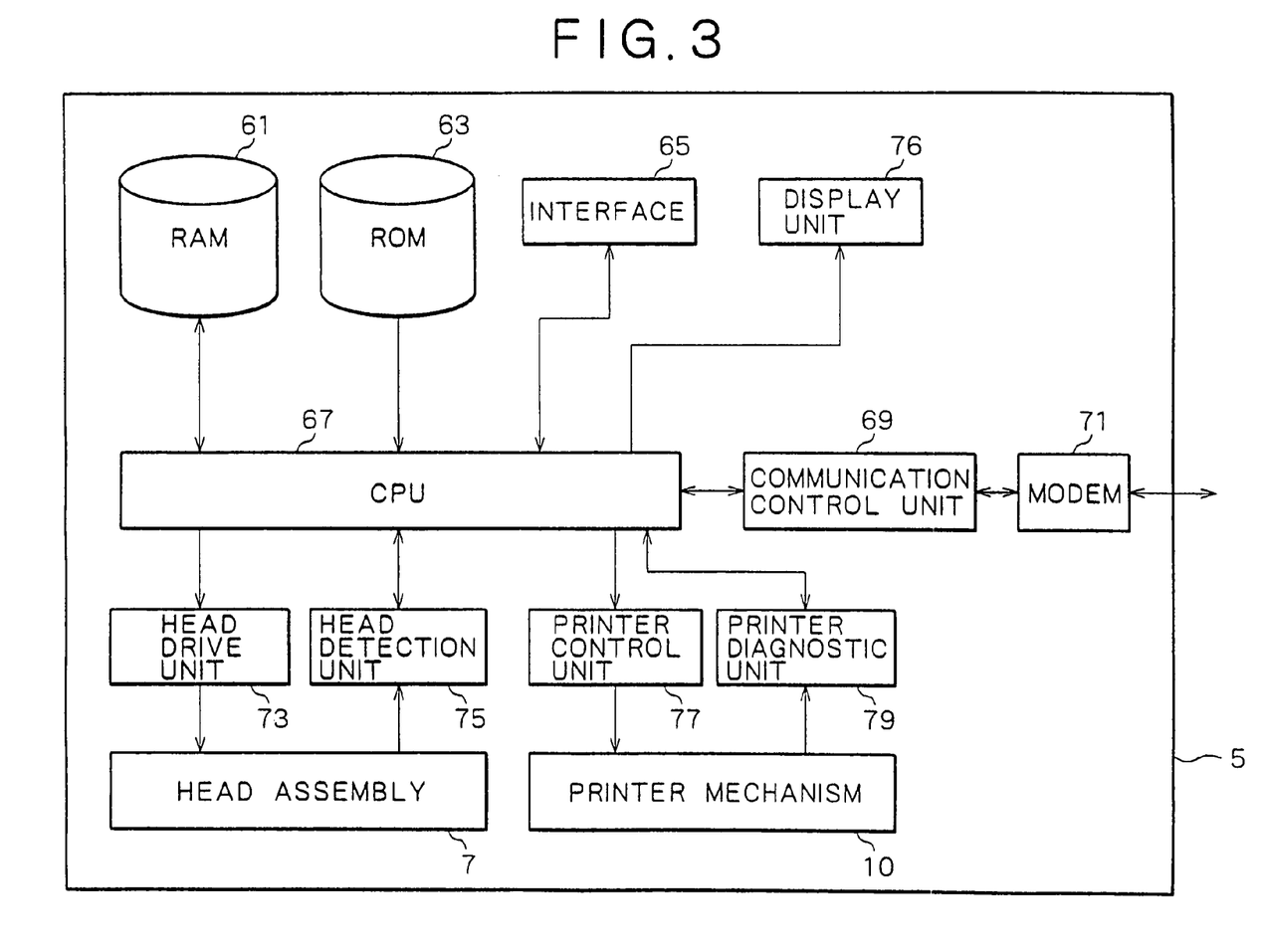
FIG. 3 is a block diagram showing an electrical structure of a printer shown in FIG. 1.

FIG. 3 is a block diagram showing an electrical structure of the printer 5 in FIG. 1. The printer 5 includes a RAM (Random Access Memory) 61, a ROM (Read Only Memory) 63, a CPU (Central Processing Unit) 67, a head drive unit 73, a head assembly 7, a head detection unit 75, a printer control unit 77, a printer mechanism 10, a printer diagnostic unit 79, a communication control, unit 69, a modem 71, a display unit 76, and an interface 65.

The RAM 61 is a storage medium to and from which data may be written and read, serving as a working area of the CPU 67. The ROM 63 is a read-only storage medium whose contents are used by the CPU 67. The ROM 63 may alternatively be of a type of memory allowing its contents to be updated. The CPU 67 is connected to the RAM 61, ROM 63, head drive unit 73, head detection unit 75, printer control unit 77, printer diagnostic unit 79, communication control unit 69, display unit 76, and interface 65. The CPU 67 controls these components and acquires data from them.

The head drive unit 73 controls operation of the head assembly 7 under control of the CPU 67. The head assembly 7 is made up of an ink cartridge and an ink-jet head cartridge. The head detection unit 75 is capable of obtaining relevant information from the head assembly 7 that is mounted removably on the printer 5. Illustratively, the head detection unit 75 detects mounting of the head assembly 7 onto the printer 5.

The printer control unit 77 controls operation of the printer mechanism 10 under control of the CPU 67. The printer mechanism 10 represents the whole printing mechanisms in the printer 5. The status of the printer mechanism 10 is diagnosed by the printer diagnostic unit 79.

The communication control unit 69 controls the modem 71, operating under control of the CPU 67. The communication control unit 69 controls communications of the printer 5. The modem 71 serves to convert digital data from the communication control unit 69 into analog data. Alternatively, the communication control unit 69 may perform its communication using digital data in a LAN connection setup without recourse to analog data arrangements. In such a case, the modem 71 needs to be replaced by a suitable interface such as a network card. The display unit 76 displays necessary images and characters under control of the CPU 67. The interface 65 may illustratively permit connection with a Centronics interface printer cable or a LAN cable in a network environment in order to communicate image or character data to be printed.

Figure 4:
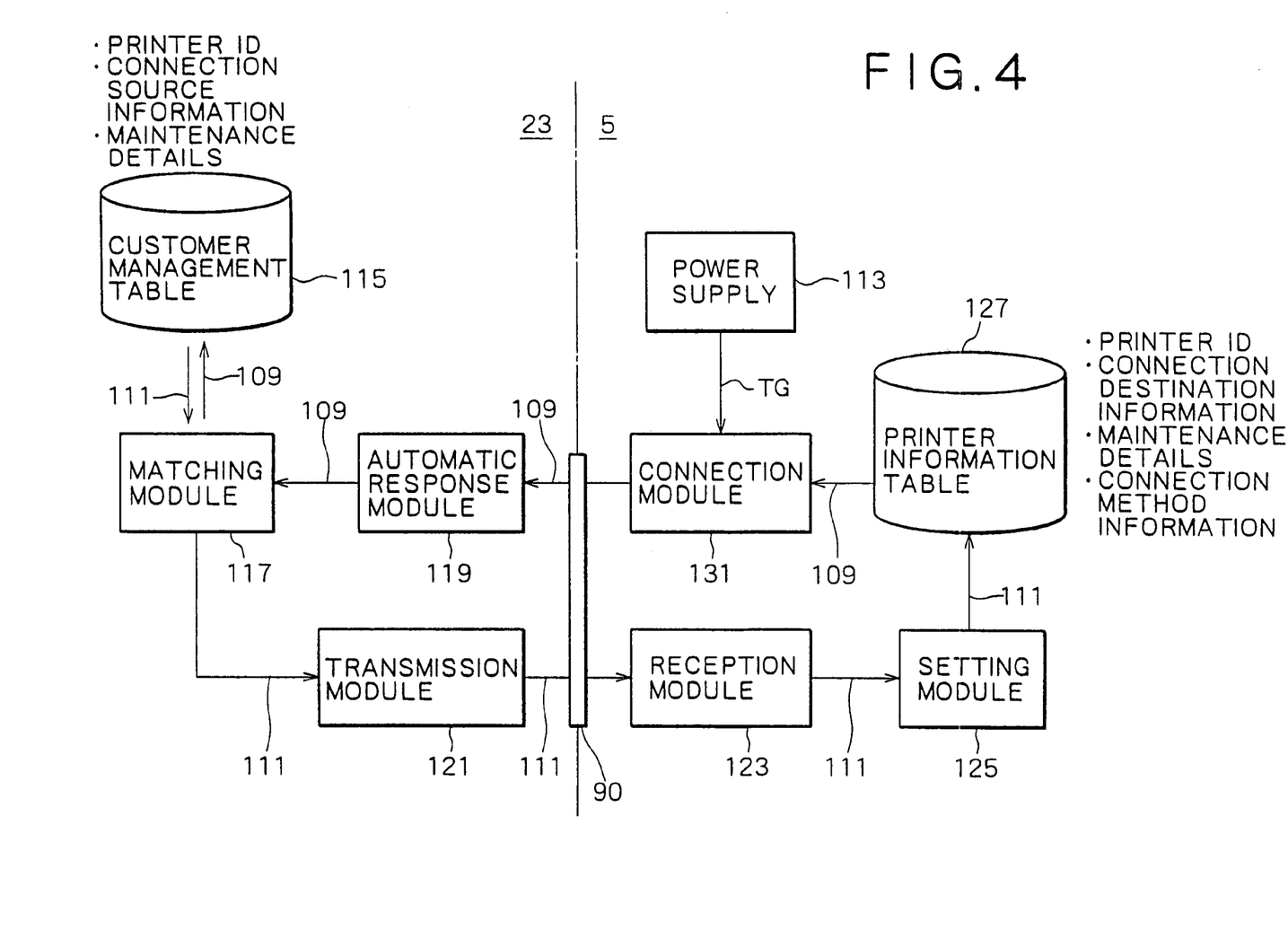
FIG. 4 is a block diagram depicting a software module structure of a printer and a service center server.

FIG. 4 is a block diagram depicting a software module structure of the printer 5 and a server center server 23. In FIG. 4, the network 90 is shown simplified. The software structure may have part or all of its component modules combined or integrated as desired.

In the printer 5, the CPU 67 of FIG. 3 uses the RAM 61 as a work area in which to run software. The printer 5 in FIG. 4 illustratively comprises a printer information table 127, a connection module 131 (connecting means), a reception module 123, and a setting module 125.

The printer information table 127 contains a printer ID (identification) assigned uniquely to each printer 5 as a connection source; connection destination information (information about a predetermined connection destination) representing the service center server 23 as the connection destination; menus of maintenance offerings; and connecting method information. The printer ID allows the server center server 23 to identify each of the multiple printers 5 configured. The connection destination information may illustratively be a telephone number of a telephone line (including a cellular phone line) or an IP (Internet Protocol) address used by the service center server 23. The menus of maintenance offerings show what kinds of maintenance services the printer 5 may receive from the service center server 23. The printer information table 127 is stored illustratively in the ROM 63 of FIG. 3.

Upon detecting a trigger signal TG from a power supply 113, the connection module 131 acquires query information 109 including the printer ID, connection destination information and menus of maintenance offerings from the printer information table 127, and transmits the acquired information automatically to the service center server 23 over the network 90. That is, the connection module 131 makes a connection request to the service center server 23.

The reception module 123 receives response information 111 from the service center server 23. The setting module 125 may write contents of the response information 111 to the printer information table 127. The contents of the response information 111 illustratively make up new maintenance detail information that may be received by the printer 5. The contents appear as menus of maintenance offerings on the display unit 76 when the printer 5 is turned on next time.

The service center server 23 has an automatic response module 119 (receiving means), a matching module 117 (judging means, permission granting means), a customer management table 115, and a transmission module 121 (permission granting means). The customer management table 115 illustratively has printer IDs stored therein which are used to identify the printers that have been sold and are subject to maintenance. Typically, the automatic response module 119 remains continuously active, receiving and responding to the query information 109 from the printers 5. The matching module 117 searches the customer management table 115 for a printer ID, i.e., a search key included in the query information 119 received by the automatic response module 119.

By making the search, the matching module 117 judges whether there is any matching printer ID. If no matching printer ID is found, the matching module 117 generates response information 111 that will reject connection with the printer 5 in question. If the matching printer ID is found in the table, the matching module 117 acquires the maintenance offerings from the customer management table 115 and generates response information 111 accordingly. In that case, the response information 111 supplements the connection source information with the connection destination information indicative of the service center server 23. Based on the connection destination information included in the response information 111, the transmission module 121 transmits the response information 111 to the applicable printer 5.

The structure of the connection system 100 or 100a has been described so far. Discussed below by referring to FIGS. 1 through 4 is how the system establishes its connection.

Figure 5:
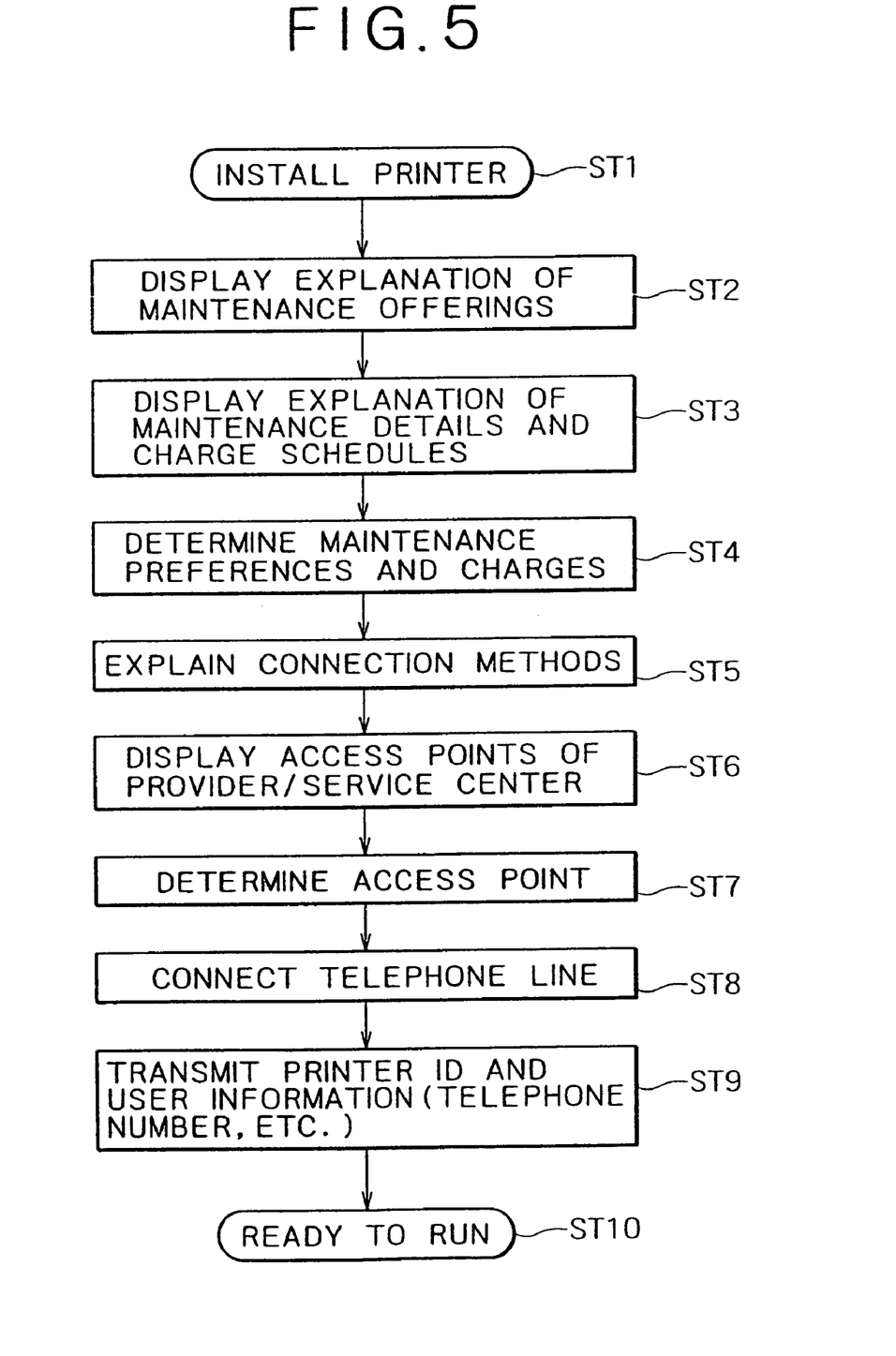
FIG. 5 is a flowchart of steps outlining the workings of the connection system in FIG. 1 and others.
Figure 6:
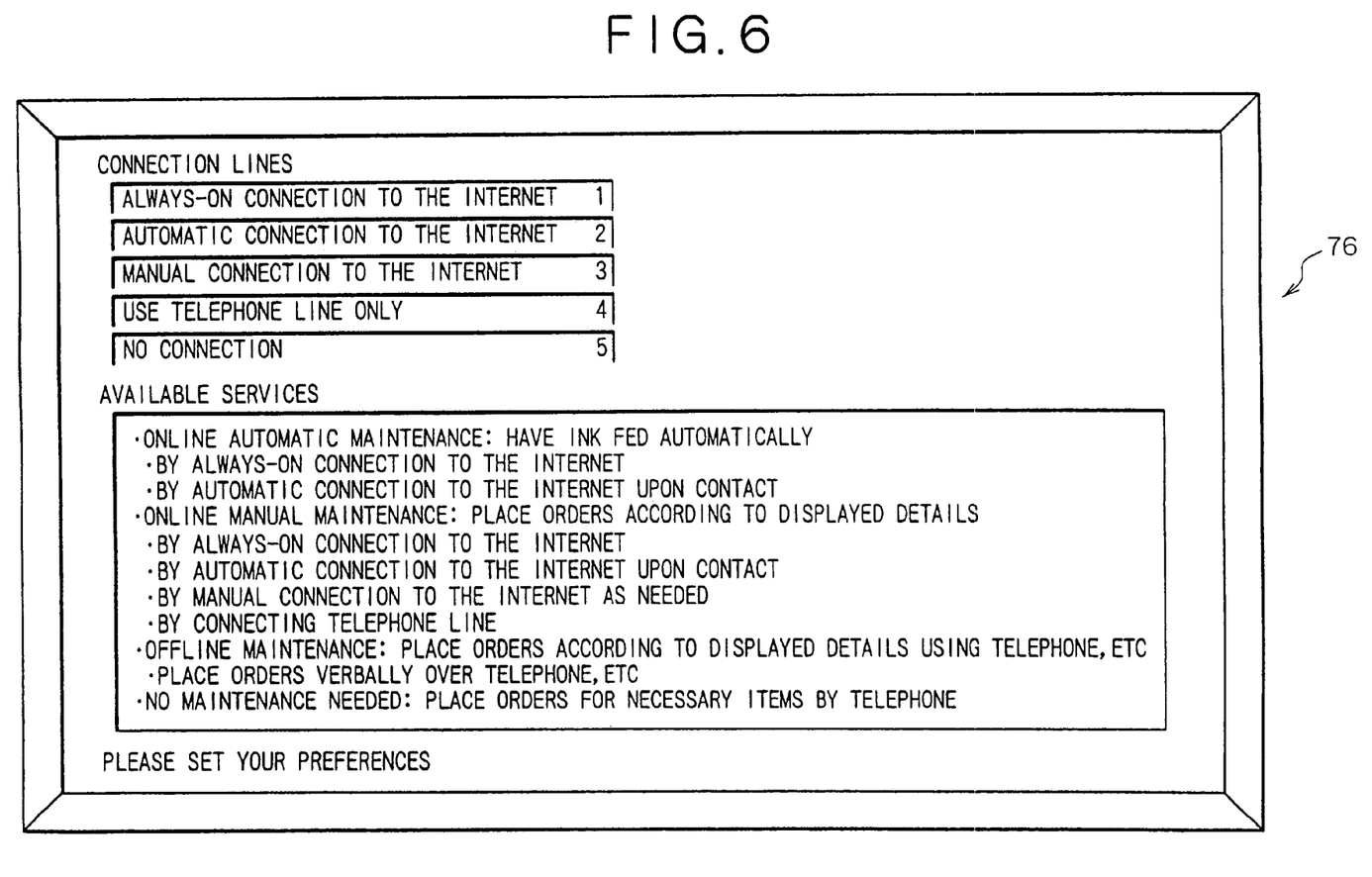
FIG. 6 is a schematic view of a typical screen displayed on a printer display unit.

FIG. 5 is a flowchart of steps outlining the workings of the connection system 100 and others. FIG. 6 is a schematic view of a typical screen displayed on the display unit 76 of the printer 5.

Setting Steps

In the service center server 23 of FIG. 4, the customer management table 115 retains beforehand printer IDs and maintenance information applicable to each of the printers 5 purchased and installed by users. The printer IDs are held in the customer management table 115 so as to identify the printers 5 that may receive maintenance from the service center. The service center thus provides maintenance services to only those users that are in possession of the suitably identified printers 5.

Connection Requesting Steps

In step ST1 of FIG. 5, the user installs the printer 5 and turns on its power source. In step St2, a screen shown in FIG. 6 appears on the display unit 76 of the printer 5. The screen primarily shows menus of connectable lines and available services. These details are displayed on the basis of the connecting method information and maintenance offerings contained in the printer information table 127 of FIG. 4. More specifically, under the heading "Available Services" come subtitle indications "Online Automatic Maintenance," "Online Manual Maintenance," "Offline Maintenance" and "No Maintenance Needed."

The "online automatic maintenance" works in such a manner that when, say, ink is judged to have been exhausted in the ink cartridge of the head assembly 7 in the printer 5 of FIG. 3, a new ink cartridge or head assembly 7 is delivered automatically from the service center to the printer site for replenishment. If this maintenance service is selected, one of two options may be picked by the user: "always-on connection to the Internet," or "automatic connection to the Internet upon contact" (for lack of ink) as shown in FIG. 6.

The "always-on connection to the Internet" signifies that the printer 5 is always connected actively to the service center 23 through a perpetual hookup to the Internet that is one example of the network 90 in FIG. 4. In this setup, the printer 5 may communicate with the service center server 23 whenever the ink level drops below a predetermined threshold. The "automatic connection to the Internet upon contact," on the other hand, signifies that the printer 5 hooks up automatically to the service center server 23 through the Internet when ink is judged exhausted. In this case, the printer 5 contacts the service center server 23 only when the ink level is low. Since connection is established only when necessary, connection charges can be reduced.

The "online manual maintenance" allows the user to place orders manually for a new ink cartridge or head assembly 7 with the server center illustratively when the ink level in the cartridge is judged to be low in the head assembly 7 of the printer 5 in FIG. 3. If this maintenance service is selected, one of four options may be picked: "always-on connection to the Internet," "automatic connection to the Internet upon contact" (for lack of ink), "manual connection to the Internet as needed," or "telephone line connection."

The "always-on connection to the Internet" and the "automatic connection to the Internet upon contact" were discussed above and thus will not be described further. The "manual connection to the Internet as needed" signifies that the user will connect the printer 5 manually to the service center server 23 through the Internet when ink is judged exhausted. This type of connection allows the printer 5 to hook up to the service center server 23 only when ink is exhausted and needs to be replenished. Since connection is established only when necessary, connection charges can be reduced.

The "telephone line connection" signifies that the user will get the printer 5 to directly call a dedicated telephone number of the service center server 23 at the service center without utilizing the network 90 such as the Internet. In this case, both the printer 5 and the service center server 23 should be capable of connecting to one another without intervention of the network 90 typified by the Internet. This type of connection permits direct hookup of the printer 5 to the service center server 23 without the user having to sign a contract with an Internet service provider. This allows the printer 5 to be connected and serviced the same way as described above without the intermediary. With this type of connection adopted, the user need only install the printer 5 before receiving maintenance services from the service center.

The "offline maintenance" signifies that when, say, ink is judged exhausted in the ink cartridge of the head assembly 7 in the printer 5 of FIG. 3, the user will place orders for a new ink cartridge or head assembly 7 with the service center by telephone or like means in accordance with the menu display on the display unit 76. Where this maintenance service is selected, the user opts for "placing of orders over telephone, etc." as shown in FIG. 6.

The "no maintenance needed" alternative signifies that when, say, the ink level is judged low in the ink cartridge of the head assembly 7 in the printer 5 of FIG. 3, the user will not place orders for a new ink cartridge or head assembly 7 with the service center by telephone or the like according to the menu display on the display unit 76. That is, the user will directly call the service center at his or her own discretion when placing orders for maintenance purposes.

In step ST3 of FIG. 5, the display unit 76 of the printer 5 displays an explanation of maintenance details and charge schedules. The charges apply to the maintenance services that the user may utilize when replenishing the printer 5 with ink. In step ST4 of. FIG. 5, the user decides on the desired maintenance service and charge schedules for the printer 5.

In step ST5 of FIG. 5, the user is prompted to check the alternative methods of connecting the printer 5 to the service center server 23. Specifically, the display unit 76 of the printer 5 displays "Always-on Connection to the Internet," "Automatic Connection to the Internet," "Manual Connection to the Internet," "Use Telephone Line Only," and "No Connection" as shown in FIG. 6. The specifics of these preferences have been discussed above and thus will not be described further.

In step ST6 of FIG. 5, the display unit 76 displays either access points of the service center server 23 if connection is to be established without recourse to any Internet service provider 103 in FIG. 1, or access points of the Internet service provider 103 if connection between the printer 5 and the service center server 23 should pass through the Internet service provider 103. These access points are indicated on the basis of the connection destination information held in the printer information table 127 of FIG. 4. The access point display allows the user to connect the printer 5 to an appropriate access point depending on the permanent or roaming location of the printer.

In step ST7 of FIG. 5, the user selects one of the access points. In step ST8 of FIG. 5, a telephone line hooked up to a public switched telephone network is connected to a suitable port of the printer 5. The telephone line may alternatively be connected earlier to the printer 5.

In step ST9 of FIG. 5, the printer 5 allows the connection module 131 of FIG. 4 to connect in a desired manner (e.g., automatically) to the service center server 23. With connection established, the printer 5 transmits query information 109 to the service center server 23. The query information 109 is made up of the printer ID and user information such as the selected maintenance service and the telephone number of the connection source. The printer 5 of FIG. 4 in turn acquires response information 111 from the service center server 23. The printer 5 is now ready to run (in step ST10).

The above-described preferred embodiment eliminates the need for the user to make complicated settings and allows the printer 5 to hook up easily to the service center server 23. Because the printer 5 can be connected automatically to the service center server 23, the printer 5 may illustratively receive maintenance services whereby ink is consumed in cost-efficient fashion. The automated hookup also allows the printer 5 to be serviced in a more environment-friendly manner.

The embodiment above is only an example and not limitative of the invention. Illustratively, a program or programs constituting the series of steps described above may be installed into a computer for execution, carried by suitable program storage media such as package media including floppy disks, CD-ROMs (Compact Disc-Read Only Memories) and DVDs (Digital Versatile Discs); or semiconductor memories, magnetic disks and the like where the programs are stored temporarily or permanently. Such program storage media may accommodate the programs that have been delivered through wired or wireless communication media such as local area networks, the Internet, and digital satellite broadcasting networks, as well as through diverse communication interfaces such as routers and modems. The printers 5 and the service center server 23 discussed above may each have a drive unit at least capable of reading data from any one of these program storage media.

Although the foregoing embodiment was shown having the user select the method of connecting the printer 5 to the service center server 23, this is not limitative of the invention. Alternatively, automatic connection alone may be offered and the user's intervention eliminated.

Any of the component blocks or modules making up the above-described embodiment may be omitted in part or may be combined in a manner different from what was discussed above.

In brief, as described, the invention provides a connection apparatus, a connecting method and a storage medium for storing a computer-readable program having connecting functions whereby a connection source is connected easily to a connection destination with no complicated settings required.

As many apparently different embodiments of this invention may be made without departing from the spirit and scope thereof, it is to be understood that the invention is not limited to the specific embodiments thereof except as defined in the appended claims.

What is claimed is:

1. A connection apparatus for automatically connecting a connection source to a predetermined connection destination;
wherein said connection source comprises:
information about said predetermined connection destination; and
connecting means for making a connection request to said predetermined connection destination based on said information about said predetermined connection destination and, given a permission, for automatically connecting to said connection destination; and
wherein said predetermined connection destination comprises:
receiving means for receiving said connection request from said connection source;
judging means which, upon interpreting said connection request, judges whether said connection source is a predetermined connection source or not; and
permission granting means which, if said judging means judges said connection source to be a predetermined connection source, grants connection permission to said connection source; and
wherein said connection request constitutes a request for connection to an Internet service provider as well as a request for connection to said receiving means.

2. A connecting method for automatically connecting a connection source to a predetermined connection destination, the method comprising the steps of:
setting information about said predetermined connection destination to said connection source in advance;
causing said connection source to make a connection request to said predetermined connection destination based on said information about said predetermined connection destination;
causing said predetermined connection destination to receive said connection request from said connection source in order to judge whether said connection source is a predetermined connection source or not upon interpreting said connection request;
if said connection source is judged to be a predetermined connection source by said judging means, then granting connection permission to said connection source; and
connecting said connection source to said predetermined connection destination; and
wherein said connection request constitutes a request for connection to an Internet service provider as well as a request for connection to said connection destination.

3. A computer-readable program storage medium used for a connecting method for automatically connecting a connection source to a predetermined connection destination, which stores a program with connecting functions, said program comprising the steps of:
setting information about said predetermined connection destination to said connection source in advance;
causing said connection source to make a connection request to said predetermined connection destination based on said information about said predetermined connection destination;
causing said predetermined connection destination to receive said connection request from said connection source in order to judge whether said connection source is a predetermined connection source or not upon interpreting said connection request;

if said connection source is judged to be a predetermined connection source by said judging means, then granting connection permission to said connection source; and connecting said connection source to said predetermined connection destination; and wherein said program further comprises a connecting function whereby said connection request is deemed to constitute a request for connection to an Internet service provider as well as a request for connection to said connection destination.

* * * * *